US010826556B2

(12) United States Patent
Malarky

(10) Patent No.: US 10,826,556 B2
(45) Date of Patent: Nov. 3, 2020

(54) METHOD FOR CALIBRATING AN ONBOARD UNIT, SYSTEM, AND ONBOARD UNIT THEREFOR

(71) Applicant: Kapsch TrafficCom AG, Vienna (AT)

(72) Inventor: Alastair Malarky, Petersburg (CA)

(73) Assignee: Kapsch TrafficCom AG, Vienna (AT)

( * ) Notice: Subject to any disclaimer, the term of this patent is extended or adjusted under 35 U.S.C. 154(b) by 57 days.

(21) Appl. No.: 15/702,165

(22) Filed: Sep. 12, 2017

(65) Prior Publication Data

US 2018/0091184 A1 Mar. 29, 2018

(30) Foreign Application Priority Data

Sep. 29, 2016 (EP) .................................... 16191421

(51) Int. Cl.
| | |
|---|---|
| *H04Q 5/22* | (2006.01) |
| *H04B 15/00* | (2006.01) |
| *G08G 1/00* | (2006.01) |
| *H04W 52/38* | (2009.01) |
| *H04B 1/40* | (2015.01) |
| *H04B 7/26* | (2006.01) |
| *G07B 15/06* | (2011.01) |

(52) U.S. Cl.
CPC ............ *H04B 1/40* (2013.01); *G07B 15/063* (2013.01); *H04B 7/26* (2013.01); *H04W 52/38* (2013.01); *G06Q 2240/00* (2013.01)

(58) Field of Classification Search
None
See application file for complete search history.

(56) References Cited

U.S. PATENT DOCUMENTS

| | | | | |
|---|---|---|---|---|
| 5,086,389 A | * | 2/1992 | Hassett ................. | G06Q 30/04 235/384 |
| 6,300,882 B1 | * | 10/2001 | Inoue ................... | G07B 15/063 340/928 |
| 6,661,352 B2 | * | 12/2003 | Tiernay ................ | G07B 15/063 235/384 |

(Continued)

FOREIGN PATENT DOCUMENTS

| | | |
|---|---|---|
| CN | 105006027 A | 10/2015 |
| EP | 2541503 A1 | 1/2013 |

OTHER PUBLICATIONS

Extended European Search report received for European Patent Application No. 16191421.3-1953, dated Apr. 12, 2017, 10 pages.

*Primary Examiner* — Tuan A Tran
(74) *Attorney, Agent, or Firm* — Fiala & Weaver P.L.L.C.

(57) ABSTRACT

The disclosed subject-matter relates to a method for calibrating an onboard unit of a vehicle identification system, the method comprising: emitting at least one polling message from a first radio beacon; in the first radio beacon, determining a link margin of a communication with a first onboard unit by evaluating a response message of the first onboard unit to the polling message(s); and sending a configuration message from the first radio beacon or a second radio beacon to the first onboard unit or to a second onboard unit with a same characteristic as the first onboard unit to adjust a receive sensitivity or a transmit power of the first or the second onboard unit, respectively, to a level derived from the determined link margin. Alternative embodiments relate to a system and to an onboard unit used in the method.

22 Claims, 8 Drawing Sheets

(56) References Cited

U.S. PATENT DOCUMENTS

| | | | | |
|---|---|---|---|---|
| 7,385,525 | B2* | 6/2008 | Ho | G07B 15/063 340/905 |
| 7,408,480 | B2* | 8/2008 | Woo | G07B 15/063 340/572.1 |
| 7,479,896 | B2* | 1/2009 | Ho | G07B 15/06 340/907 |
| 7,813,699 | B2* | 10/2010 | Ho | G07B 15/063 235/384 |
| 8,456,274 | B2* | 6/2013 | Modiano | G07B 15/063 340/5.2 |
| 8,508,341 | B2* | 8/2013 | Kohli | G07B 15/063 340/10.1 |
| 9,652,645 | B2* | 5/2017 | Tuttle | G06K 19/0723 |
| 2004/0092233 | A1* | 5/2004 | Rudrapatna | H04W 52/60 455/69 |
| 2007/0075839 | A1* | 4/2007 | Ho | G07B 15/06 340/10.2 |
| 2007/0146162 | A1 | 6/2007 | Tengler et al. | |
| 2010/0237998 | A1 | 9/2010 | Kohli et al. | |
| 2012/0166256 | A1 | 6/2012 | Wang et al. | |

* cited by examiner

METHOD FOR CALIBRATING AN ONBOARD UNIT, SYSTEM, AND ONBOARD UNIT THEREFOR

CROSS-REFERENCE TO RELATED APPLICATION(S)

This application claims priority to European Patent Application No. 16 191 421.3, filed on Sep. 29, 2016, the disclosure of which is herein incorporated by reference in its entirety.

BACKGROUND

Technical Field

The present application relates to a method for calibrating an onboard unit of a radio frequency automatic vehicle identification (AVI) system by a radio beacon. Radio beacons herein are two-way communication systems, i.e., having the capability to both send and receive messages. The application further relates to a system for calibrating an onboard unit of a road toll system and to an onboard unit for a road toll system.

Background Art

Onboard units are carried by vehicles to determine the presence or passage of a vehicle, for example to determine the toll the vehicle has incurred by travelling on chargeable roads of a road toll system. To this end, multiple roadside radio beacons are distributed over the road toll system. When the onboard unit comes within the vicinity of a radio beacon, a wireless communication is performed between the radio beacon and the onboard unit.

The radio beacons create transaction records for tolling the driver of the vehicle by matching the communication with the onboard unit of the vehicle to the vehicle itself, which may be registered by presence detectors such as cameras for enforcement purposes. Depending on the type of onboard unit, on the mounting position of the onboard unit in or on the vehicle, and on the body shape of the vehicle itself, the communication between the radio beacon and the onboard unit may start and end at different distances from the radio beacon. This is, however, a problem for the radio beacon since it cannot unambiguously correlate a vehicle to a communication with the onboard unit anymore. This results in early or late reporting, where the onboard unit communicates too early or too late with respect to the detection of the vehicle, or even missed reporting such that transaction records cannot be created.

To overcome this problem, presently the communication capabilities of the radio beacons in the AVI system are tuned, based on reference vehicles and/or statistics on actual live traffic measurements. However, this is still not optimal as the onboard units can be mounted at will on or in the vehicles. The mounting locations of the onboard unit and the different vehicle body shapes influence the characteristics of the communication due to different electromagnetic shieldings and multi-path reflections at different parts of the vehicle. Therefore, onboard units of the same type can have different communication characteristics depending on which vehicle and at which location on the vehicle they are mounted. Furthermore, different types of onboard units having different communication characteristics are used in the road toll system.

BRIEF SUMMARY

An object of the present application is to provide an onboard unit, system and a method of calibration to overcome drawbacks of the art. To this end, in a first aspect of the subject matter of the present application provides for a method for calibrating an onboard unit of a vehicle identification system, the method comprising the steps in the following order: emitting at least one polling message from a first radio beacon; in the first radio beacon, determining a link margin of a communication with a first onboard unit by evaluating a response of the first onboard unit to the polling message(s); and sending a configuration message from the first radio beacon or a second radio beacon to the first onboard unit or to a second onboard unit with a same characteristic as the first onboard unit to adjust a receive sensitivity or a transmit power of the first or the second onboard unit, respectively, to a level derived from the determined link margin.

The application thus creates a way of adjusting onboard units not only based on the intrinsic communication characteristics, but also provides a way of compensating effects caused by the mounting positions of the onboard unit in or on a vehicle as well as the characteristics of the vehicle. The communications in the road toll system between onboard units and radio beacons can now be perfectly adjusted not only for one type and one mounting position of onboard units and/or vehicle characteristics but also without having to perform statistical analyses over the multitude of onboard unit mountings and vehicle characteristics, which would only allow optimization of the mean of the communication characteristics of the onboard units within the road toll system.

By calibrating the onboard units of the road toll system, the distance from the radio beacon at which the onboard units first respond and cease to respond can be unified such that communications can unambiguously be linked to vehicle detectors and possibly images of the vehicle. A mismatch between a communication and a different vehicle thus becomes a lot less likely. Reliability of creating toll transactions is thereby significantly improved, which directly relates to a better determination of toll this vehicle has incurred.

The subject matter of the present application provides for three embodiments to determine the link margin between the radio beacon and the onboard unit. In a first embodiment, the first radio beacon emits multiple polling messages during a single beacon passage of the first onboard unit, each polling message having the same transmit power, and the link margin of the communication with the first onboard unit is determined during said beacon passage by measuring the received signal strength of the responses of the first onboard unit to the polling messages.

This embodiment requires an apparatus for measuring the received signal strength in the radio beacon. Here it is especially easy to determine the link margin in the direction of the radio beacon since it directly relates to the signal strengths measured in the radio beacon.

Optionally, in this first embodiment, the configuration message may adjust the transmit power of the first or the second onboard unit, respectively, such that the maximum received signal strength received in the radio beacon is substantially the same for all calibrated onboard units of the road toll system. By means of unifying the peaks of the received signal strength in the direction of the radio beacon, indirectly the distance from the radio beacon at which the onboard units first and last respond to polling signals of the radio beacon is unified for all onboard units of the road toll system.

Alternatively, if the relationship between the onboard unit receive sensitivity and the transmit power is known, the link margin in the opposite direction can be inferred and the configuration message can adjust the receive sensitivity so that the link margin in the direction of the onboard unit is substantially the same for all calibrated onboard units.

In the second embodiment, to measure the link margin, the first radio beacon emits multiple polling messages during a single beacon passage of the first onboard unit and varies the transmit power of the polling messages during said beacon passage, and the link margin of the communication in the direction of the onboard unit with the first onboard unit is determined during said beacon passage by the response of the first onboard unit that was received in response to the polling message having the lowest transmit power amongst all polling messages for which a response was received. This embodiment requires no additional hardware to measure properties of the received messages in the radio beacon. It is thus possible to determine the link margin simply by varying the transmit power of the polling messages and evaluating whether a response to a polling message of a certain transmit power is received or not. To determine the peak of the link margin, the lowest transmit power for which a response can be received is determined.

Optionally, the transmit power of the polling messages is varied according to a pre-set pattern, which is repeated at least once during said beacon passage. This reduces computation power in the radio beacon since it does not have to be evaluated whether responses to the polling messages were received or not to determine the next transmit power.

Alternatively, the transmit power for a next polling message during said beacon passage is lowered when a response message has been received in response to the preceding polling message and is increased when no response message has been received in response to the preceding polling message. By means of this, the transmit power of the radio beacon follows the link margin of the communication between the onboard unit and the radio beacon. The link margin can thus be determined more precisely, especially when the step sizes of the transmit power are adjusted to a plurality of results from preceding polling messages.

Also in the abovementioned second embodiment, optionally the configuration message adjusts the receive sensitivity of the first or the second onboard unit, respectively, such that the lowest transmit power of a polling message for which a response can be received is substantially the same for all calibrated onboard units of the road toll system. Here the peaks of the link margins are unified for the communications between the radio beacon and all onboard units of the road toll system by adapting the lowest transmit power for which a response can be received. Again, this results in indirectly unifying the distance from the radio beacon at which a response from onboard units is first and last received.

In the third embodiment of measuring the link margin, the first radio beacon emits multiple polling messages during a single beacon passage of the first onboard unit, each polling message having the same transmit power, and the link margin of the communication with the first onboard unit is determined by counting the number of responses received in the radio beacon during said beacon passage. This yields a very easy to compute yet effective method for calibrating the onboard unit because no additional equipment is needed and the transmit power of the polling messages does not have to be varied. Optionally this embodiment is performed on sections of the road on which passing vehicles substantially have the same speed such that the number of responses received in the radio beacon is not distorted too much by external factors.

Optionally in this third embodiment the configuration message adjusts the transmit power or receive sensitivity of the first or the second onboard unit, respectively, such that the number of responses received in the radio beacon during one beacon passage is substantially the same for all calibrated onboard units, travelling at substantially the same speed, of the road toll system. The number of responses received in the radio beacon is a measure of the length of the area over which onboard units can communicate with the radio beacon. Thus, indirectly also the distance from the radio beacon, at which the onboard units first and last respond to polling messages, is made substantially the same for all onboard units of the road toll system.

It is also highlighted that the first and the third embodiment of the method can be combined to measure the link margin in both directions such that the onboard units can be adjusted more precisely.

In the second and third embodiment, using the known relationship between the onboard unit receive sensitivity and the onboard unit transmit power, the link margin in the opposite direction can be inferred.

All the above-mentioned embodiments can be performed without measuring any characteristic of the vehicle. In an embodiment, however, the speed and/or position of the first onboard unit is measured during the beacon passage, and the configuration message adjusts the transmit power or receive sensitivity of the first or the second onboard unit, respectively, such that the length of the section over which the first onboard unit can reply to polling messages is substantially the same for all calibrated onboard units of the road toll system. In one variant of this embodiment, the speed can be measured by evaluating the Doppler shift of the received message in the radio beacon such that no sensor measuring the properties of the vehicle has to be utilized. For the first two embodiments to measure the link margin as discussed above, i.e., when the received signal strength is measured or when the lowest transmit power of a successful communication is determined, the entire curve of the link margin and not just the peak of the link margin can be fully determined. By means of this, the distance of the onboard unit to the radio beacon, at which a response from the onboard unit can first be received in a radio beacon, can directly be determined from the measured link margin. In the third embodiment to measure the link margin, the measured speed and/or position of the onboard unit helps to normalize the number of responses received in the radio beacon.

To even out measurement errors, the determined link margin of the first onboard unit is stored in a central station of the road toll system and the level indicated in the configuration message is based on the determined link margin and on at least one previously determined link margin retrieved from the central station. Thus, the method is independent of external influences occurring only once during a measurement, e.g., weather conditions, and can further adjust the measurements over time, e.g., caused by dirt on the windshield of the vehicle accumulating during travel of the vehicle. The previously determined link margins retrieved from the central station can be from the same onboard unit or from a different onboard unit having a same characteristic, e.g., from a different onboard unit mounted on the same type of vehicle.

In a second aspect of the subject matter of the present application, a system for calibrating an onboard unit of a road toll system is provided, in which a first radio beacon is configured to determine a link margin of a communication with a first onboard unit by emitting at least one polling message and evaluating a response of the first onboard unit to the polling message(s), and wherein the first radio beacon or a second radio beacon is configured to emit a configuration message to the first onboard unit or to a second onboard unit with a same characteristic as the first onboard unit to adjust a receive sensitivity or a transmit power of the first or the second onboard unit, respectively, to a level derived from the determined link margin.

All features and advantages as discussed above for the method are also applicable to the radio beacon.

In a third aspect the subject matter of the present application provides for an onboard unit for a road toll system, comprising: a transceiver for wirelessly communicating with a radio beacon, which transceiver is configured to emit messages with a transmit power and has a receive sensitivity for receiving messages, and a processor, which can receive messages from the radio beacon via the transceiver, a memory to store a transceiver parameter, wherein the memory is accessible by the transceiver and the processor, wherein the transmit power or the receive sensitivity of the transceiver depend on the stored transceiver parameter, and wherein the processor is configured to adjust the transceiver parameter upon receipt of a configuration message from the radio beacon to a level indicated in the configuration message.

The onboard unit thus comprises equipment such as the memory and the adjustable transceiver to allow for the communication characteristics of the onboard unit to be adjusted even during travel. The onboard unit does not have to be opened up or physically manipulated to change the communication characteristics, i.e., the transmit power or receive sensitivity, of the onboard unit. One main advantage of this onboard unit is that the configuration message is received via the transceiver, but it is then this very same configuration message that changes the communication characteristics of this transceiver that previously received the configuration message. This means that no additional external control input is needed for the onboard unit but just the transceiver that is used for regular communication.

Optionally, the onboard unit is configured to authenticate the received configuration message before the transceiver parameter is adjusted. This prevents that the capability of the onboard unit to change its communication characteristics is maliciously exploited. Only configuration messages from authorized sources are thus accepted before the communication characteristics of the onboard unit are changed.

BRIEF DESCRIPTION OF THE DRAWINGS/FIGURES

The subject matter of the present application shall now be explained in more detail below on the basis of exemplary embodiments thereof with reference to the accompanying drawings, in which.

DETAILED DESCRIPTION

Figure 1:
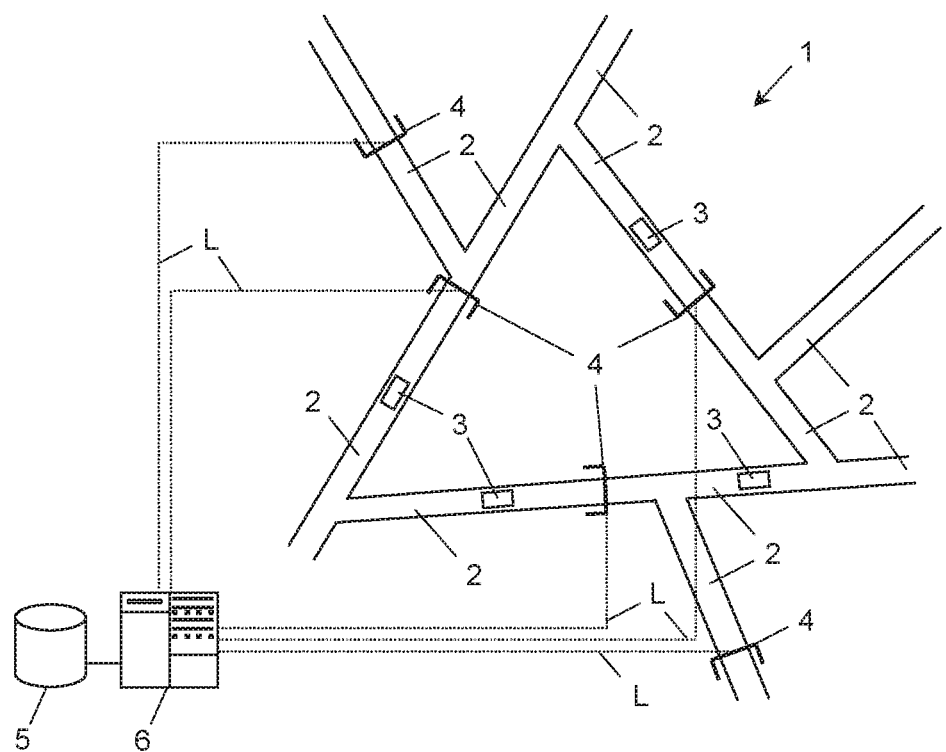
FIG. 1 shows a road toll system with radio beacons and a central server.

FIG. 1 shows a road toll system 1 with a plurality of roads 2 on which vehicles 3 drive. The road toll system 1 may employ tollable roads, such that vehicles 3 that travel on a tollable road 2 have to pay a toll fee relating to the usage of a tollable road 2. To this end, the road toll system 1 comprises a plurality of radio beacons 4, which register vehicles 3 in their vicinity. When a radio beacon 4 detects the usage of a toll road 2 by a vehicle 3, it sends a transaction record to a database 5 of a central station 6 via links L. More generally, instead of charging tolls, the system 1 can be used to simply detect the presence of vehicles such that the system 1 can be a radio frequency automatic vehicle identification (AVI) system in a more general case.

Figure 2:
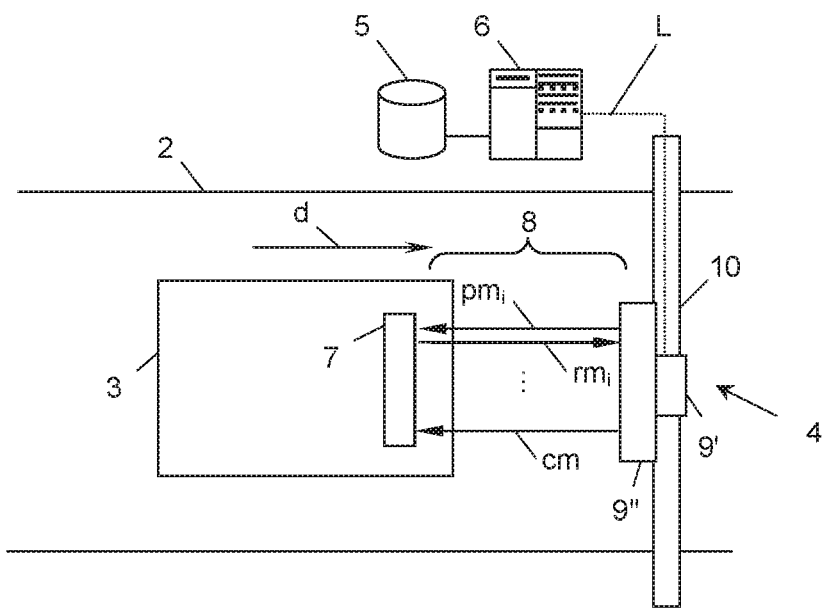
FIG. 2 shows a vehicle with an onboard unit approaching a radio beacon of the road toll system of FIG. 1.

FIG. 2 shows an exemplary vehicle 3 approaching one of the radio beacons 4 in a direction of travel d. Each vehicle 3 in the road toll system 1 carries an onboard unit (OBU) 7 to perform a wireless communication 8 with the radio beacons 4. The communication 8 can consist, for example, of a polling message $pm_i$ from the radio beacon 4 that is responded to by the onboard unit 7 with a response message $rm_i$, wherein i is an index of polling, i.e., i=0, 1, 2, . . . .

To perform the communication 8, the radio beacon 4 comprises an antenna 9' and a transceiver 9". The antenna 9' can be mounted on a gantry 10 spanning the road 2 or, in other embodiments, the mounted on the side of the road, on a bridge, or the like. The antenna 9' and the transceiver 9" can be embodied as single or individual units, and especially part or all of the transceiver can be located at a remote location. Furthermore, the radio beacon 4 can comprise a processing unit (not shown) located near the transceiver 9" or even at a central station to perform computations relating to the determination of link margins as described below.

The radio beacons 4, onboard units 7, and radio communications 8 between them can be configured in accordance with any short range radio standard known in the art, for example DSRC (dedicated short range communication, in particular CEN-DSRC), WAVE (wireless access for vehicular environment), WLAN (wireless local area network, in particular IEEE 802.11p, ITS-G5 and standards compatible therewith), RFID (radio-frequency identification, in particular the Kapsch® time-division multiplexing (TDM) protocol, ISO-18000-63 and standards compatible therewith), WiFi®, Bluetooth®, or the like. The OBUs 7 may be of the "active" type (FIGS. 5 and 6), that is to say with an independent energy supply, or of the "passive" type (FIG. 7), that is to say in the form of transponders, e.g., RFID chips ("tags"), which draw their energy from the radio field of a radio beacon 4 addressing them, the radio beacon then being embodied for example in the form of an RFID reader.

In any case, as a part of the communication 8, the onboard unit 7 emits response messages $rm_i$ with a transmit power and has a receive sensitivity for received polling messages $pm_i$. This means that the onboard unit 7 cannot receive polling messages $pm_i$ whose signal strength lies under its receive sensitivity, and, vice-versa, the radio beacon 4 cannot receive response messages $rm_i$ when the transmit power of the onboard unit 7 is too low. Therefore, the communication 8 between the onboard unit 7 and the radio beacon 4 is either downlink limited, uplink limited, or both.

Figure 3:
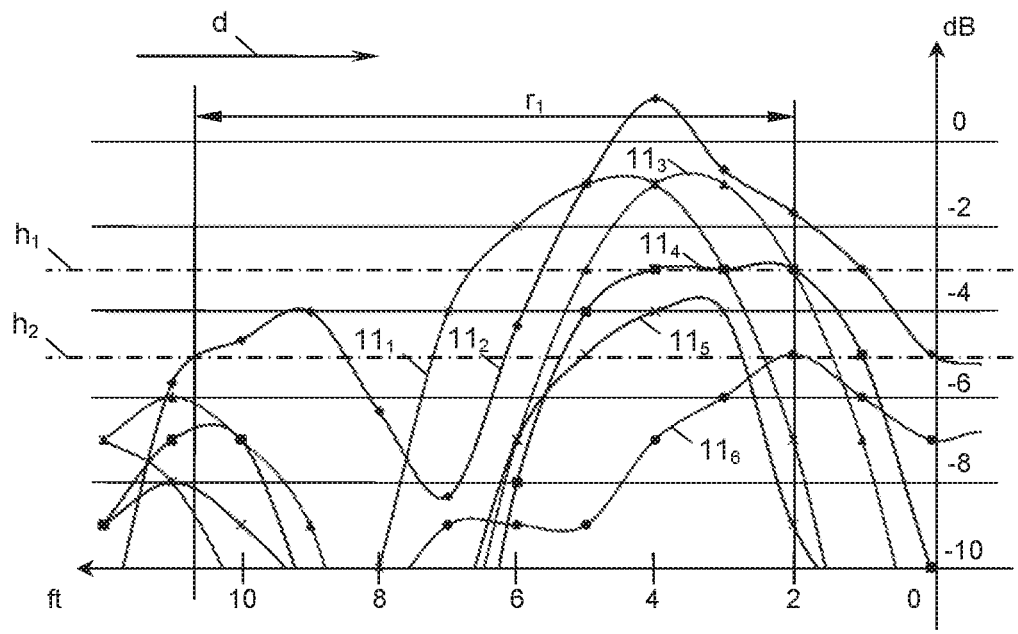
FIG. 3 shows six link margins of six uncalibrated onboard units with different communication characteristics resulting from mounting and/or vehicle characteristics.

FIG. 3 shows six exemplary (uplink) link margins $11_1, \ldots, 11_6$, generally M, of six different onboard units 7. The link margin can either be defined as an uplink link margin or a downlink link margin. The uplink link margin, here measured in dB, is the difference between the radio beacon's receive sensitivity and the actual received signal strength in the radio beacon. The downlink link margin is the difference between the onboard unit's receive sensitivity and the actual received signal strength in the onboard unit. In the following, the uplink link margin will be used as an example.

In FIG. 3, the link margins M are different because either onboard units 7 of the same type are mounted at different locations on a vehicle 3 (or on different vehicles 3 altogether), such that electromagnetic interferences or multipath effects due to the vehicle shape affect the communication 8 between the onboard unit 7 and the radio beacon 4. Furthermore, the onboard units 7 can be of a different type, i.e., have different receive sensitivities and transmit powers from the outset.

When the radio beacon 4 is tuned to only obtain response messages $rm_i$ from the onboard unit 7 when the link margin M is −3 dB (reference line $h_1$) with respect to an arbitrary reference, we can see that the link margins $11_5$, $11_6$ lie under this threshold such that they do not yield in a communication 8 with the radio beacon 4. When the radio beacon 4 is tuned to only obtain response messages $rm_i$ when the link margin M is −6 dB (reference line $h_2$) with respect to the arbitrary reference, then the first response messages $rm_i$ of the onboard units 7 approaching the radio beacon 4 in the direction of travel d lie in a range of 11-2 feet in front of the radio beacon 4. Because this range $r_1$ is so wide, the communications 8 cannot be directly and unambiguously linked to the vehicle 3 since there might by a plurality of vehicles 3 in this large range $r_1$.

To unify the distances of first responses, the onboard units 7 are calibrated as follows. Firstly, the radio beacon 4 repeatedly emits polling messages $pm_i$ upon which an onboard unit 7 responds with response messages $rm_i$, forming the communication 8 as discussed above. Secondly, the radio beacon 4 determines the link margin M of the communication 8 by evaluating the response messages $rm_i$ of the onboard unit 7 to the polling messages $pm_i$. This will be described in detail below by means of FIGS. 8 to 13. Thirdly, the radio beacon 4 sends a configuration message cm (see FIG. 1) to the onboard unit 7 such that the onboard unit 7 can change its communication characteristics, i.e., its receive sensitivity or its transmit power, to a level derived from the determined link margin.

The configuration message cm can either comprise direct instructions, e.g., "set transmit power to 10 dB" or "reduce receive sensitivity by 10%", or it can contain indirect instructions such as determined link margin and desired link margin, whereupon the onboard unit 7 calculates the adjustments to transmit power or receive sensitivity.

The configuration message cm can be sent by the same radio beacon 4 that determined the link margin M, for example after the peak of the link margin M has been determined and the communication 8 between the onboard unit 7 and the radio beacon 4 is still possible, or by means of a second antenna (not shown) of the same radio beacon 4. Alternatively, the configuration message cm can be sent to the onboard unit 7 when the onboard unit 7 passes the radio beacon 4 for a second time, or the configuration message cm can be sent to the onboard unit 7 by a different radio beacon 4. To this end, the radio beacons 4 can communicate directly or via the central station 6 with each other.

Furthermore, the radio beacon 4 can determine the link margin M of a communication 8 with a first onboard unit 7 but send the configuration message cm to a second onboard unit with a same characteristic as the first onboard unit 7. The same characteristic can be a type of the onboard unit 7, a mounting position of the onboard unit 7 on the vehicle 3, a type of the vehicle 3, a combination thereof, and so forth. This means that only the link margin M of one onboard unit 7 has to be measured to calibrate all onboard units 7 with the same characteristic, e.g., of the same type. This greatly reduces computation and measuring times to obtain the link margins M.

Figure 4:
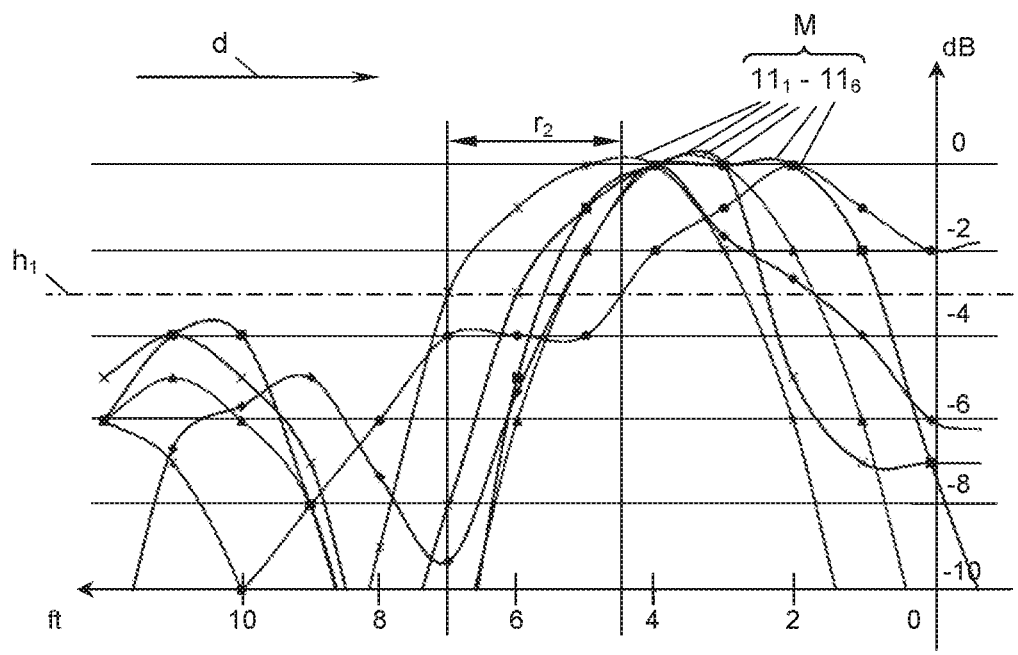
FIG. 4 shows six link margins of the six calibrated onboard units of FIG. 3.

FIG. 4 shows link margins $11_1, \ldots, 11_6$ of six different onboard units 7 that have been calibrated as described herein such that the peaks of the link margins M are substantially the same. The onboard units 7 achieve this by adjusting their transmit power or receive sensitivity as detailed below. We can see from FIG. 4 that, with the radio beacon set to only obtain responses $rm_i$ when the link margin is −3 dB with respect to the arbitrary reference, the first response messages $rm_0$ in the direction of travel d of the onboard units 7 to the radio beacon 4 occur in a tight range $r_2$ of 7-4 feet from the radio beacon 4. Alternatively, if the relation of the link margins M to the distance from the antenna is well known, e.g., by additionally measuring the speed and/or position of the vehicles 3 while the link margin is being measured, the distance of the first response messages $rm_0$ of all onboard units 7 could be standardized. In this case, the peaks of the link margins M would differ.

Figure 5:
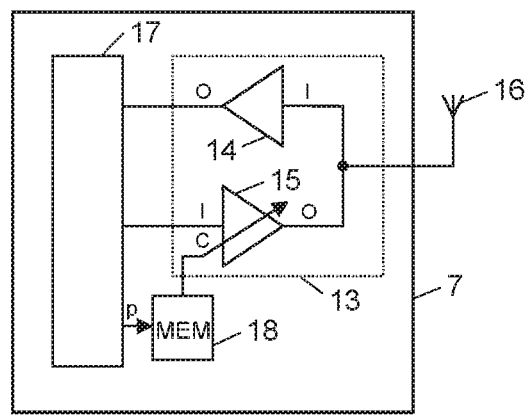
FIGS. 5 to 7 show different embodiments of onboard units of the application.

FIG. 5 shows an onboard unit 7 that is able to change its transmit power upon the receipt of a configuration message cm. The onboard unit 7 comprises a transceiver 13 for wirelessly communicating with the radio beacon 4. The transceiver 13 comprises a receiver 14 and a transmitter 15, each having an input I and an output O. The onboard unit 7 further comprises an antenna 16 for sending and receiving connected to the input I of the receiver 14 and to the output O of the transmitter 15.

The transceiver 13 routes received polling and configuration messages $pm_i$, cm via the output O of the receiver 14 to a processor 17 of the onboard unit 7. Conversely, the processor 17 outputs a response message $rm_i$ to the input I of the transmitter 15.

The onboard unit 7 further comprises a memory 18, which stores a transceiver parameter p and is accessible by both the transceiver 13 and the processor 17. In the case of FIG. 5, the transmit power of the transmitter 15 can be adjusted via a control input C according to a transceiver parameter p stored in the memory 18 and applied to the control input C. The transmitter 15 may comprise, e.g., an amplifier circuit or attenuator whose gain is adjustable via the control input C, or comprise a digital-to-analogue converter circuit whose scaling is controllable via the control input C.

Figure 6:
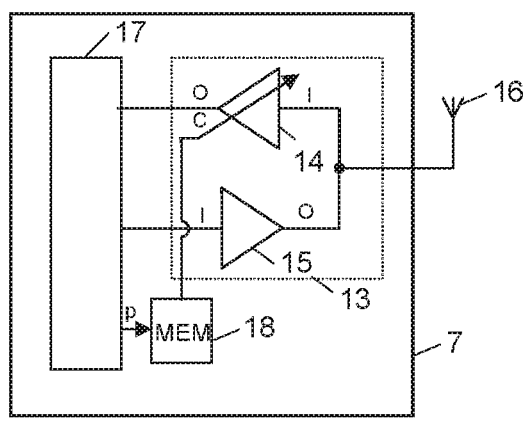

FIG. 6 shows an onboard unit 7 with the same components as the onboard unit of FIG. 5. However, in this case the receive sensitivity of the receiver 14 can be adjusted via a control input according to the transceiver parameter p retrieved from the memory 18. The receiver 14 may comprise, e.g., an amplifier circuit whose gain is adjustable via the control input C, or an analogue-to-digital converter whose scaling is controllable via the control input C. Alternatively, the receiver 14 could contain an adjustable attenuator, which can be controlled via the transceiver parameter p applied to the control input C.

Figure 7:
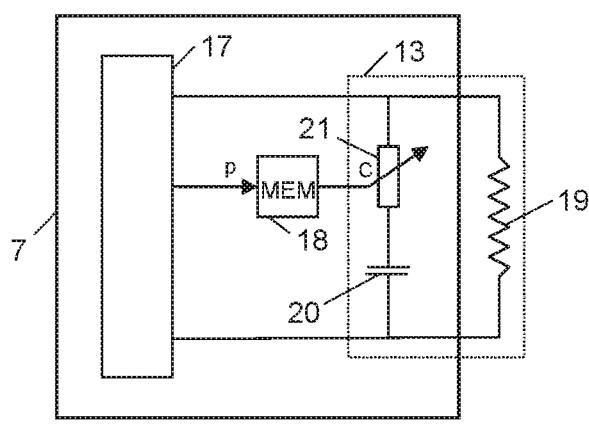

FIG. 7 shows a passive onboard unit 7 operated by backscatter modulation so that it does not need an external power source to send response messages $rm_i$. To this end, the onboard unit 7 has a transceiver 13 in form of an oscillator circuit comprising a coil 19, serving as antenna, capacitor 20, and controllable impedance 21 with a control input C. The processor 17 modulates the impedance 21 of the oscillating circuit 13 for the communication 8, and the transceiver parameter p retrieved from the memory 18 sets the receive sensitivity and the transmit power of the transceiver 13 via the control input C.

All elements shown in FIGS. 5-7 can be embodied as discrete components or also as combined circuits such as in the form of ASIC (Application-Specific Integrated Circuits) or FPGA (Field Programmable Gate Array) chips. Especially the memory 18 can be included within the processor 17 or the component 14, 15, 21 to be controlled itself.

In all of the embodiments of FIGS. 5 to 7, the processor 17 is configured to check whether an incoming message $pm_i$, cm is a configuration message cm or not. If it is a configuration message cm, the processor 17 writes the transceiver parameter p into the memory 18 as indicated in the configuration message cm. Optionally, when the processor 17 receives a configuration message cm, it authenticates the received configuration message cm before the transceiver parameter p is adjusted in the memory 18. This can be done by various methods known in the art, for example by obtaining a public key from the radio beacon 4 according to a public/private key encryption scheme or by comparing an electronic signature of the configuration message cm with a signature stored in the onboard unit.

Figure 8:
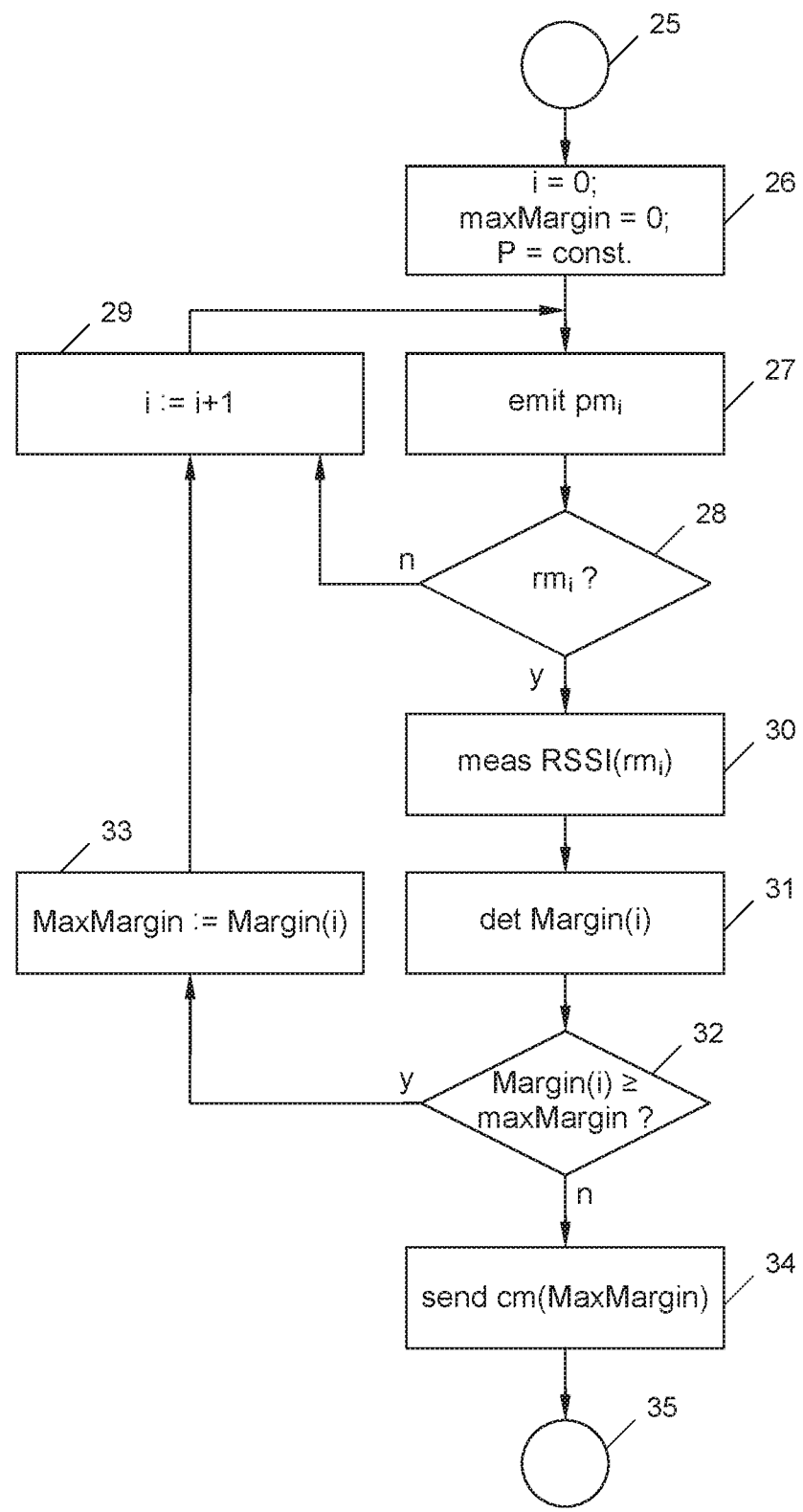
FIG. 8 shows a flow chart of a first embodiment of the method of the application to calibrate an onboard unit.

As indicated above, there exist various methods to determine the link margin in the radio beacon 4. FIG. 8 shows a first method, in which the received signal strength of a response message $rm_i$ is measured in the radio beacon 4. The method is initialized in a step 25 and sets the polling index i to 0, a maximum margin maxMargin used for computational purposes to 0, and a transmit power P of the radio beacon 4 to a predetermined constant level in step 26.

The radio beacon 4 then emits a polling message $pm_i$ in step 27 and checks whether a response message $rm_i$ has been received in the radio beacon 4 in step 28. If no response message $rm_i$ has been received (branch "n"), the polling index i is increased by one in step 29 and the method returns to the step 27 of polling.

If a response message $rm_i$ has been received in step 28 (branch "y"), the method proceeds to step 30 of measuring the received signal strength of the response message $rm_i$ and assigns a received signal strength indicator (RSSI) to the received response message $rm_i$. In step 31, the current link margin M or Margin(i), respectively, is determined by means of the RSSI of the received response message $rm_i$.

In step 32 it is checked whether the current link margin Margin(i) is the highest link margin determined so far by comparing it to the currently stored maximum margin maxMargin. If this is the case, this means that the peak of the link margin M has not yet been determined. In this case (branch "y"), the method proceeds to step 33, where it sets the maximum link margin maxMargin to the current link margin Margin(i). The polling index i is incremented in step 29, and polling is resumed in step 27.

This loop is performed as long as the peak of the link margin M has not yet been found in step 32. If the current margin Margin(i) is lower than a previously determined maximum link margin in step 32 (branch "n"), the peak of the link margin M has been found, whereupon a configuration message cm can be sent from the radio beacon 4 to the onboard unit 7 in step 34 on the basis of the peak link margin maxMargin. The onboard unit 7 can then adjust its receive sensitivity or transmit power as described above, and the method ends (35).

This method can also be changed in such a way that, for example, polling is resumed even after the peak of the link margin M has been determined to obtain the full curve of the link margin M as shown in FIG. 3. It is also to be understood that polling can be resumed in any case at a constant rate and is not stopped after the peak of the link margin M of a certain onboard unit 7 has been found such that communications 8 with different onboard units 7 can also be started.

Figure 9A:
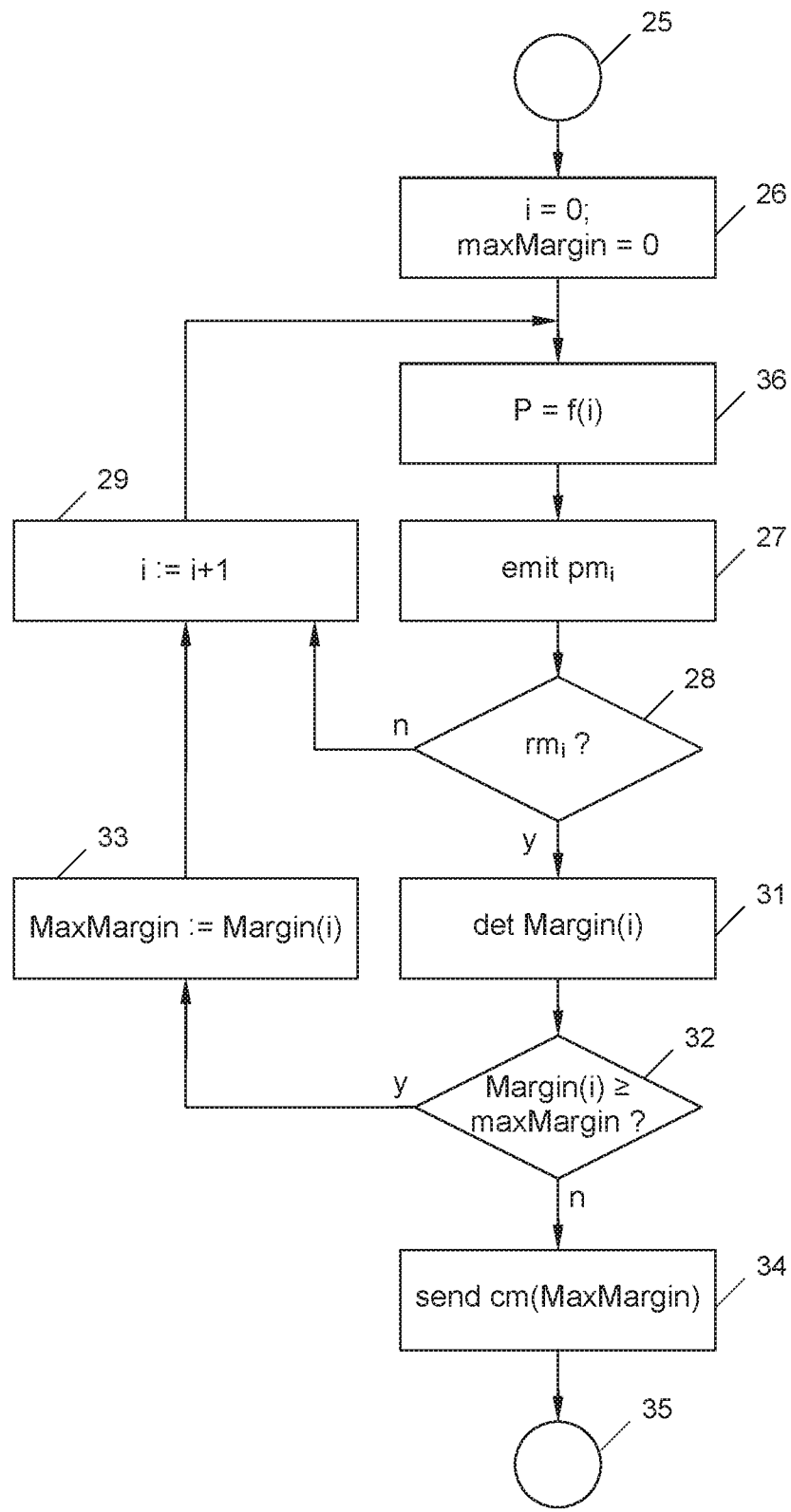
FIGS. 9a and 9b show flow charts of two different variants of a second embodiment of the method to calibrate an onboard unit.

FIG. 9a shows a variant of the method of FIG. 8, wherein same steps have been labelled with same reference signs. In the method of FIG. 9a, however, instead of measuring the received signal strength in the radio beacon 4, the peak of the link margin M is determined by varying the transmit power P of the polling messages $pm_i$ according to a pre-set pattern f(i), which is repeated at least once during the beacon passage of an onboard unit 7. The transmit power P of the polling messages $pm_i$ is adjusted according to this scheme f(i) in step 36.

Figure 10B:
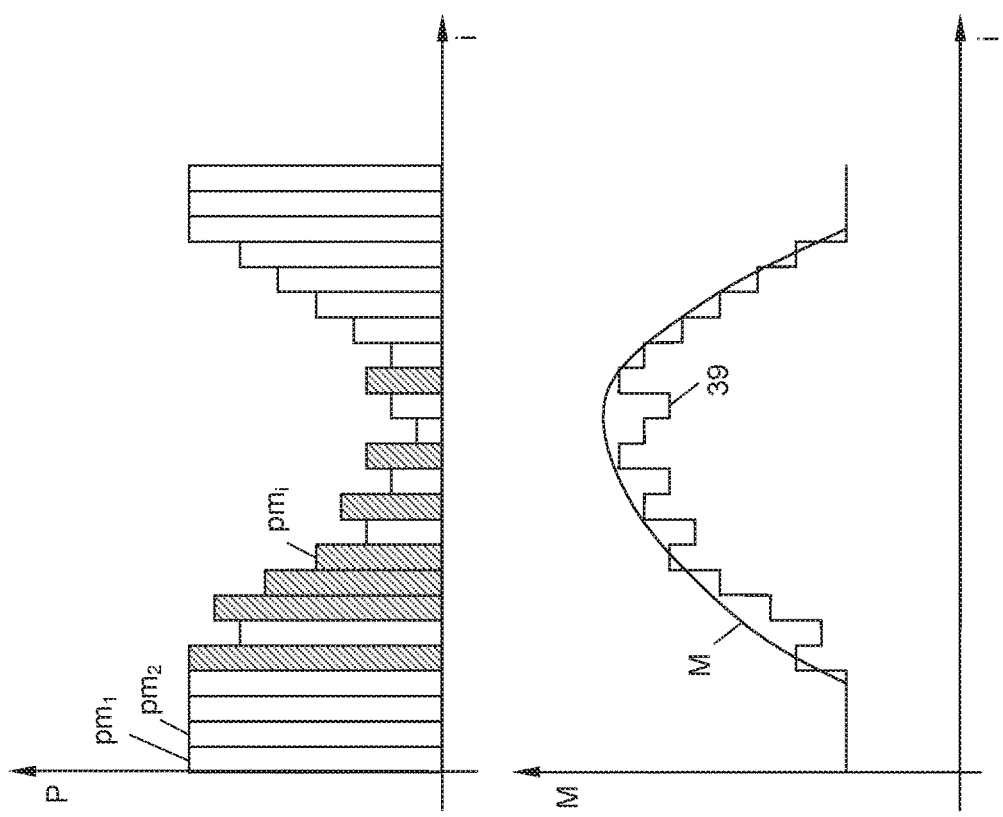
FIGS. 10a and 10b show two different schemes of adjusting the transmit power according to the embodiments of FIGS. 9a and 9b.
Figure 10A:
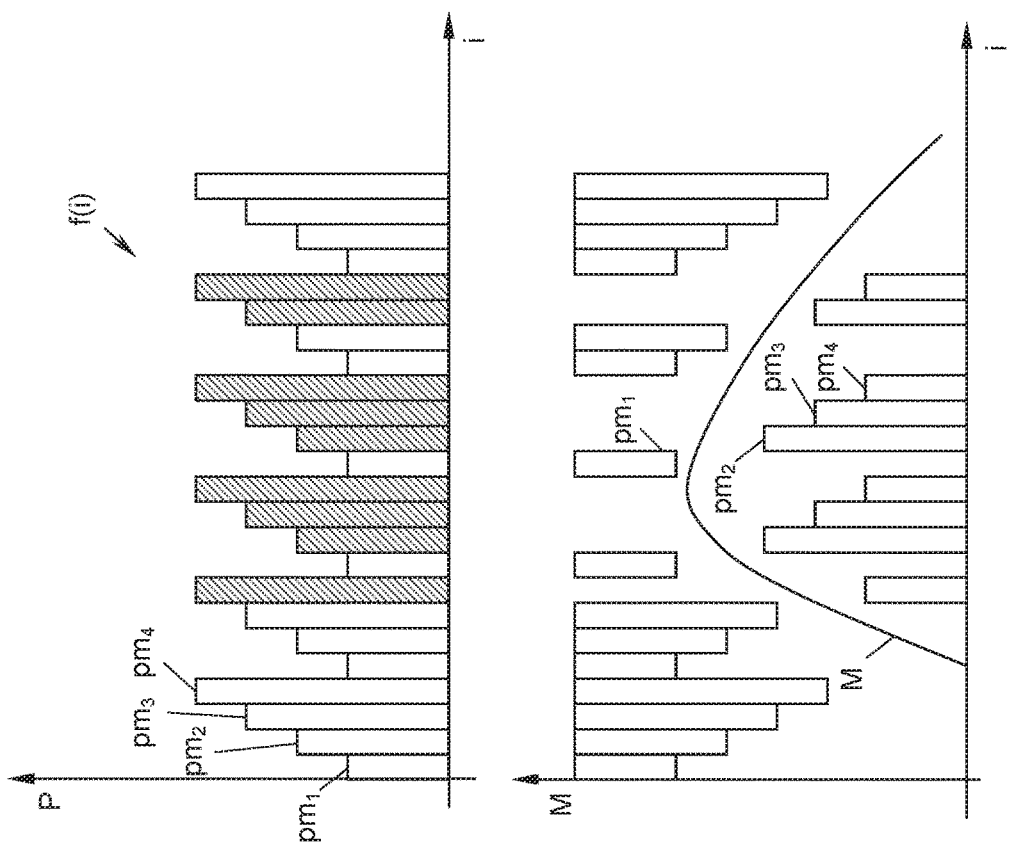

An example of the pre-set pattern f(i) can be seen in FIG. 10a, upper diagram (x-axis: time index i; y-axis: transmit power P [dB]), where the pattern f(i) comprises four polling messages $pm_1$, ..., $pm_4$, each having a transmit power higher than the previous polling message, and the pattern is repeated thereafter. In FIG. 10a, upper diagram, empty bars depict polling messages $pm_i$ for which no response message $rm_i$ was received, and hatched bars depict polling messages $pm_i$ for which a response message $rm_i$ was received in the radio beacon 4. Of course, different patterns f(i) could be used, too, including random patterns.

The peak of the link margin M is here determined by means of that response message $rm_i$ of the onboard unit 7 that was received in response to the polling message $pm_i$ having the lowest transmit power p amongst all polling messages $pm_i$ for which a response $rm_i$ was received. Also with this method, the full curve of the link margin M can be determined even after the peak of the link margin M has been found. FIG. 10a shows in the lower diagram (x-axis: time index i; y-axis: link margin M [dB]) that polling messages $pm_i$ for which no response messages $rm_i$ have been received limit the upper bound of the link margin M, whereas polling messages $pm_i$ for which a response message $rm_i$ has been received limit the lower bound of the link margin M.

Figure 9B:
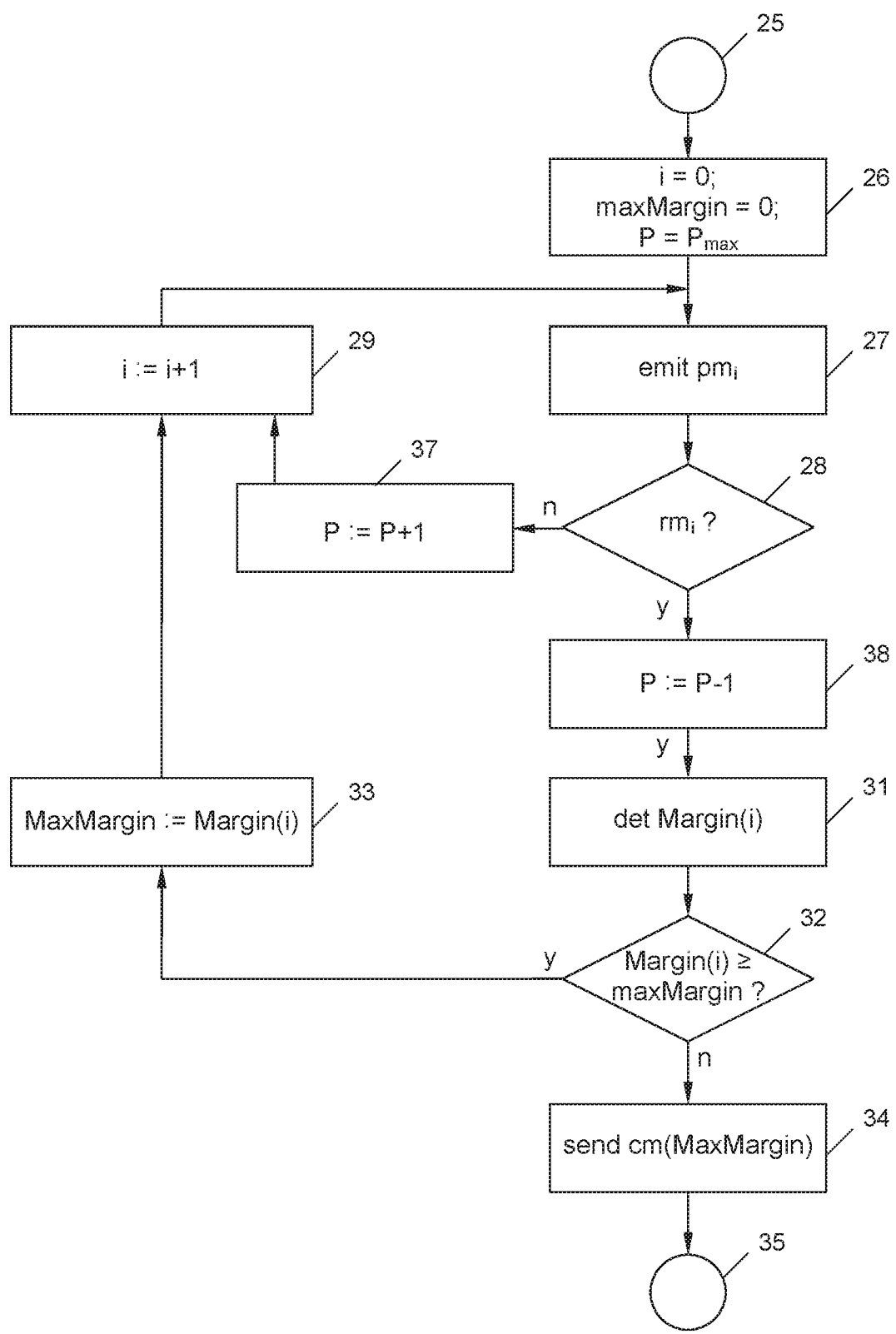

FIGS. 9b and 10b show a variant of the method of the FIGS. 9a and 10a, wherein the transmit powers P are not varied according to a pre-set pattern, but the transmit power P of the polling messages $pm_i$ is determined according to whether a response $rm_i$ has been received for the preceding polling message $pm_i$ or not. If no polling message $pm_i$ has been received in step 28 (branch "n"), in step 37 the transmit power P is increased for the next polling message $pm_{i+1}$ such that the likelihood of a successful communication 8 is increased. If, however, the onboard unit 7 has responded to a polling message $pm_i$ in step 28 (branch "y") the transmit power P for the next polling message $pm_{i+1}$ is decreased in step 38.

This scheme can also be seen in FIG. 10b, upper diagram (x-axis: time index i; y-axis: transmit power P [dB]), with polling messages $pm_1$, $pm_2$, .... In FIG. 10b, upper diagram, empty bars depict polling messages $pm_i$ for which no response was received, and hatched bars depict polling messages $pm_i$ for which a response message $rm_i$ was received in the radio beacon 4. Again, unsuccessful communications 8 limit the upper bound of the link margin M and successful communications 8 limit the lower bound of the link margin M, as can schematically be seen in FIG. 10b, lower diagram (x-axis: time index i; y-axis: link margin M [dB]), in which the line 39 schematically shows these bounds.

Figure 11:
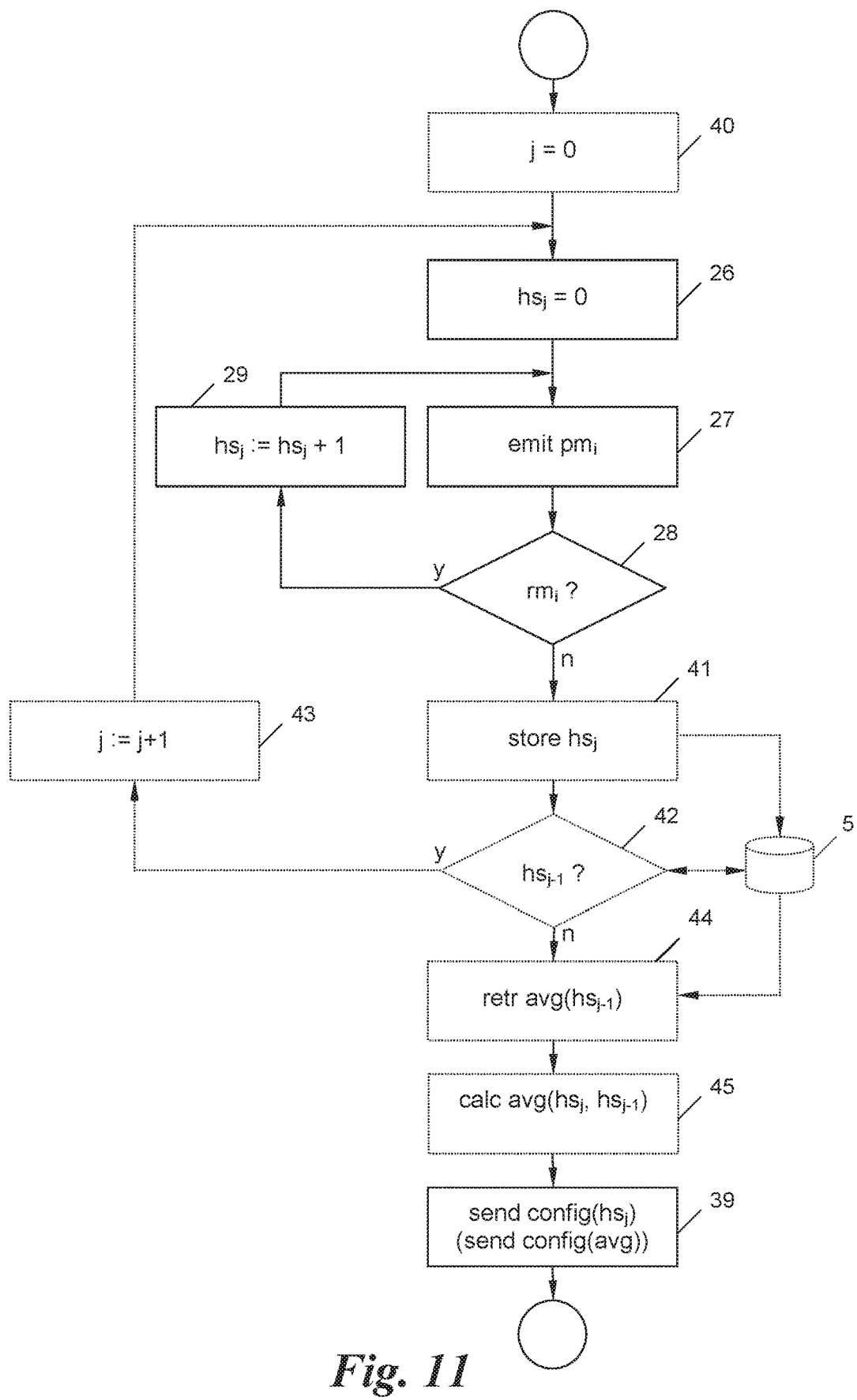
FIG. 11 shows a flow chart of a third embodiment of the method to calibrate an onboard unit.

FIG. 11 shows yet another variant of the method of FIG. 8. Here, the number of successful communications 8 ("handshakes") is counted for one beacon passage j. In the simplest variant, the steps 40-45 shown in dotted lines in FIG. 11, which correspond to a statistical analysis based on multiple beacon passages j=1, 2, . . . , are optional, such that only one beacon passage j can be considered, too. One beacon passage of index j, shown in solid lines in FIG. 11, is described in the following.

In the initialization step 26, a handshake count $hs_j$ is set to 0. Polling is performed in step 27 over the loop 27-28-29, i.e., as long as there is a response message $rm_i$ in step 28, after which the handshake count $hs_j$ is incremented in step 29.

If no response message $rm_i$ is detected in step 28 (branch "n"), the method proceeds to step 34 to send the configuration message cm to the onboard unit 7. In this case, the number of handshakes $hs_j$ is a measure for the area over which communications 8 were received during the beacon passage j and thus also a measure, at least indirectly, for the distance to the radio beacon 4 at which the communication 8 between the onboard unit 7 and the radio beacon 4 was first successful. All onboard units 7 can thus be calibrated to have the same length of the area over which the onboard units 7 reply to polling messages $pm_i$.

The optional steps 40 to 45 in FIG. 11 provide for a method to perform a statistical averaging of the link margin M over multiple beacon passages j=1, 2, . . . of the onboard unit 7. The beacon passages may be passages through the same radio beacon 4 or through different radio beacons 4 distributed over the road toll system 1. The statistical analysis for multiple radio beacon passages is only shown for the method of FIG. 11, but can also be employed for the methods of FIG. 8, 9a or 9b.

At the outset, a beacon passage counter j is set to 0 in step 40, which precedes all other steps mentioned above. After the step 28 of checking whether a response message $rm_i$ has been received or not, i.e., after the determination of the link margin M or the measure thereof, in this case the handshake count $hs_j$, is stored in step 41 in the database 5 via the links L shown in FIG. 1. Then, in step 42 it is checked whether there are enough previously determined link margins M or measures thereof, in this case previously measured handshakes $hs_{j-1}$, available in the database 5. If this is not the case (branch "n" of step 42), the onboard unit 7 performs at least one more beacon passage, and the beacon passage counter j is incremented in step 43.

However, if in step 42 enough previously determined link margins M or measures thereof are available in the database 5 (branch "y"), the radio beacon 4 retrieves the previously determined link margin/s M or measure/s thereof from the database 5 in step 44. In step 45, an average of the currently detected link margins M and the previously determined link margin M is calculated. It is understood that an arbitrary number of predetermined link margins M can be used for the averaging in step 45, and that weighted averages and different statistical analysis can be used, too.

Thereafter, a configuration message cm is sent from the radio beacon 4 to the onboard unit 7 in step 34, such that the onboard unit 7 sets its receive sensitivity or transmit power to a level based on the calculated average link margin. The entities used for the statistical analysis can be the same as or different from the central station 6, database 5, and links L used for determining the toll.

The statistical analysis mentioned above can be performed by taking into account either only previously determined link margins M of the same onboard unit 7 or also previously determined link margins M of different onboard units 7 having a same specific (vehicle) characteristic, e.g., the same vehicle model.

CONCLUSION

The subject matter of the present application is not restricted to the specific embodiments described in detail herein, but encompasses all variants, combinations and modifications thereof that fall within the framework of the appended claims.

What is claimed is:

1. A method for calibrating an onboard unit of a vehicle identification system, the method comprising:
   emitting at least one polling message from a first radio beacon;
   in the first radio beacon, determining a link margin of a communication with a first onboard unit by evaluating a response message of the first onboard unit to the at least one polling message; and
   sending a configuration message from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level indicated by said instructions, whereupon said first or second onboard unit, respectively, adjusts its receive sensitivity or transmit power, respectively, to said level indicated by said instructions,
   wherein at least one of speed and position of the first onboard unit is measured during a beacon passage, and
   wherein the configuration message adjusts the transmit power or receive sensitivity of the first or the second onboard unit, respectively, such that the length of the area over which the first or the second onboard unit can reply to polling messages is substantially the same for all calibrated onboard units of the road toll system.

2. The method according to claim 1, wherein the first radio beacon emits multiple polling messages during the beacon passage of the first onboard unit, each polling message having the same transmit power, and
   wherein the link margin of the communication with the first onboard unit is determined during said beacon passage by measuring the received signal strength of the response messages of the first onboard unit to the polling messages.

3. The method according to claim 2, wherein the configuration message adjusts the transmit power or receive sensitivity of the first or the second onboard unit, respectively, such that the maximum received signal strength received in the first radio beacon is substantially the same for all calibrated onboard units of the road toll system.

4. The method according to claim 1, wherein the first radio beacon emits multiple polling messages during the beacon passage of the first onboard unit and varies the transmit power of the polling messages during said beacon passage, and
wherein the link margin of the communication with the first onboard unit is determined during said beacon passage by the response message of the first onboard unit that was received in response to the polling message having the lowest transmit power amongst all polling messages for which a response message was received.

5. The method according to claim 4, wherein the transmit power of the polling messages is varied according to a pre-set pattern, which is repeated at least once during said beacon passage.

6. The method according to claim 4, wherein the transmit power for a next polling message during said beacon passage is lowered when a response message has been received in response to the preceding polling message and is increased when no response message has been received in response to the preceding polling message.

7. The method according to claim 4, wherein the configuration message adjusts the transmit power or receive sensitivity of the first or the second onboard unit, respectively, such that the lowest transmit power of a polling message for which a response can be received is substantially the same for all calibrated onboard units of the road toll system.

8. The method according to claim 1, wherein the first radio beacon emits multiple polling messages during the beacon passage of the first onboard unit, each polling message having the same transmit power, and
wherein the link margin of the communication with the first onboard unit is determined by counting the number of response messages received in the first radio beacon during said beacon passage.

9. The method according to claim 8, wherein the configuration message adjusts the transmit power or receive sensitivity of the first or the second onboard unit, respectively, such that the number of responses received in the first radio beacon during the beacon passage is substantially the same for all calibrated onboard units, travelling at substantially the same speed, of the road toll system.

10. A method for calibrating an onboard unit of a vehicle identification system, the method comprising:
emitting at least one polling message from a first radio beacon;
in the first radio beacon, determining a link margin of a communication with a first onboard unit by evaluating a response message of the first onboard unit to the at least one polling message; and
sending a configuration message from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level indicated by said instructions, whereupon said first or second onboard unit, respectively, adjusts its receive sensitivity or transmit power, respectively, to said level indicated by said instructions,
wherein the determined link margin of the first onboard unit is stored in a central station of the road toll system and the level indicated in the configuration message is based on the determined link margin and on at least one previously determined link margin retrieved from the central station.

11. A system for calibrating an onboard unit of a vehicle identification system,
wherein a first radio beacon is configured to emit multiple polling messages during a single beacon passage of a first onboard unit with a constant transmit power,
wherein the first radio beacon is configured to determine a link margin of a communication with the first onboard unit by means of the number of response messages of the first onboard unit, to the multiple polling messages, received in the first radio beacon during the single beacon passage, and
wherein the first radio beacon or a second radio beacon is configured to emit a configuration message to the first onboard unit or to a second onboard unit with a same characteristic as the first onboard unit, which configuration message comprises instructions to adjust a receive sensitivity or a transmit power of the first or the second onboard unit, respectively, to a level indicated by said instructions.

12. The system according to claim 11,
wherein the first radio beacon is further configured to determine the link margin of the communication with the first onboard unit during the single beacon passage by means of measuring the received signal strength of the response messages of the onboard unit to the polling messages.

13. A method for calibrating an onboard unit of a vehicle identification system, the method comprising:
emitting, from a first radio beacon, multiple polling messages during a single beacon passage of a first onboard unit, each polling message having the same transmit power;
in the first radio beacon, determining a link margin of a communication with the first onboard unit by evaluating a response message of the first onboard unit to the at least one polling message; and
sending a configuration message from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin, whereupon said first or second onboard unit, respectively, adjusts its receive sensitivity or transmit power, respectively, to said level derived from the determined link margin,
wherein the link margin of the communication with the first onboard unit is determined during said beacon passage by measuring the received signal strength of the response messages of the first onboard unit to the polling message, wherein the configuration message adjusts the transmit power or receive sensitivity of the first or the second onboard unit, respectively, such that the maximum received signal strength received in the first radio beacon is substantially the same for all calibrated onboard units of the road toll system.

14. A method for calibrating an onboard unit of a vehicle identification system, the method comprising:
emitting, from a first radio beacon, multiple polling messages during a single beacon passage of a first onboard unit, wherein the transmit power of the polling messages is varied during said beacon passage;
in the first radio beacon, determining a link margin of a communication with a first onboard unit by evaluating a response message of the first onboard unit to the at least one polling message; and sending a configuration message from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin, whereupon said first or second onboard unit, respectively, adjusts its receive sensitivity or transmit power, respectively, to said level derived from the determined link margin, wherein the link margin of the communication with the first onboard unit is determined during said beacon passage by the response message of the first onboard unit that was received in response to the polling message having the lowest transmit power amongst all polling messages for which a response message was received.

15. The method according to claim 14, wherein the transmit power of the polling messages is varied according to a pre-set pattern, which is repeated at least once during said beacon passage.

16. The method according to claim 14, wherein the transmit power for a next polling message during said beacon passage is lowered when a response message has been received in response to the preceding polling message and is increased when no response message has been received in response to the preceding polling message.

17. The method according to claim 14, wherein the configuration message adjusts the transmit power or receive sensitivity of the first or the second onboard unit, respectively, such that the lowest transmit power of a polling message for which a response can be received is substantially the same for all calibrated onboard units of the road toll system.

18. A method for calibrating an onboard unit of a vehicle identification system, the method comprising:
  emitting, from a first radio beacon, multiple polling messages during a single beacon passage of a first onboard unit, each polling message having the same transmit power;
  in the first radio beacon, determining a link margin of a communication with the first onboard unit by evaluating a response message of the first onboard unit to the at least one polling message; and
  sending a configuration message from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin, whereupon said first or second onboard unit, respectively, adjusts its receive sensitivity or transmit power, respectively, to said level derived from the determined link margin,
  wherein the link margin of the communication with the first onboard unit is determined by counting the number of response messages received in the first radio beacon during said beacon passage, and
  wherein the configuration message adjusts the transmit power or receive sensitivity of the first or the second onboard unit, respectively, such that the number of responses received in the first radio beacon during one beacon passage is substantially the same for all calibrated onboard units, travelling at substantially the same speed, of the road toll system.

19. The method according to claim 18, wherein the configuration message adjusts the transmit power or receive sensitivity of the first or the second onboard unit, respectively, such that the number of responses received in the first radio beacon during the beacon passage is substantially the same for all calibrated onboard units, travelling at substantially the same speed, of the road toll system.

20. A system for calibrating an onboard unit of a vehicle identification system,
  wherein a first radio beacon is configured to determine a link margin of a communication with a first onboard unit by emitting multiple polling messages during a single beacon passage of the first onboard unit, varying the transmit power of the polling messages with a predetermined scheme, and evaluating response messages of the first onboard unit to the multiple polling messages,
  wherein the first radio beacon is configured to determine the link margin of the communication with the first onboard unit during the single beacon passage by a response message of the response messages of the first onboard unit that was received in response to the polling message having the lowest transmit power amongst all polling messages for which a response message was received, and
  wherein the first radio beacon or a second radio beacon is configured to emit a configuration message to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin.

21. A system for calibrating an onboard unit of a vehicle identification system, comprising:
  a first radio beacon configured to emit multiple polling messages during a single beacon passage of a first onboard unit, each polling message having the same transmit power,
  wherein the first radio beacon is configured to determine a link margin of a communication with the first onboard unit by evaluating a response message of the first onboard unit to the at least one polling message,
  wherein a configuration message is sent from the first radio beacon or a second radio beacon to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin, whereupon said first or second onboard unit, respectively, adjusts its receive sensitivity or transmit power, respectively, to said level derived from the determined link margin, and
  wherein the link margin of the communication with the first onboard unit is determined during said beacon passage by measuring the received signal strength of the response messages of the first onboard unit to the polling message, wherein the configuration message adjusts the transmit power or receive sensitivity of the first or the second onboard unit, respectively, such that the maximum received signal strength received in the first radio beacon is substantially the same for all calibrated onboard units of the road toll system.

22. A system for calibrating an onboard unit of a vehicle identification system, comprising:

a first radio beacon is configured to emit multiple polling messages during a single beacon passage of a first onboard unit, each polling message having the same transmit power;

wherein the first radio beacon is configured to determine a link margin of a communication with the first onboard unit by evaluating a response message of the first onboard unit to the at least one polling message, wherein the first radio beacon or a second radio beacon is configured to send a configuration message to the first onboard unit or to a second onboard unit with a same characteristic as the first onboard unit, which configuration message comprises instructions to adjust a receive sensitivity or a transmit power of the first or the second onboard unit, respectively, to a level derived from the determined link margin, whereupon said first or second onboard unit, respectively, adjusts its receive sensitivity or transmit power, respectively, to said level derived from the determined link margin, wherein the link margin of the communication with the first onboard unit is determined by counting the number of response messages received in the first radio beacon during said beacon passage, and wherein the configuration message adjusts the transmit power or receive sensitivity of the first or the second onboard unit, respectively, such that the number of responses received in the first radio beacon during one beacon passage is substantially the same for all calibrated onboard units, travelling at substantially the same speed, of the road toll system.

* * * * *